(12) United States Patent
Kaneuchi et al.

(10) Patent No.: US 8,652,374 B2
(45) Date of Patent: Feb. 18, 2014

(54) PROCESS FOR PRODUCING IN-MOLD DECORATED MOLDED ARTICLE

(75) Inventors: Kazuhiko Kaneuchi, Osaka (JP);
Gakuei Shibata, Osaka (JP); Shinji Kadoriku, Osaka (JP); Mitsuhiro Iseri, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/578,773

(22) PCT Filed: Dec. 16, 2010

(86) PCT No.: PCT/JP2010/007294
§ 371 (c)(1),
(2), (4) Date: Aug. 13, 2012

(87) PCT Pub. No.: WO2011/114409
PCT Pub. Date: Sep. 22, 2011

(65) Prior Publication Data
US 2012/0315442 A1    Dec. 13, 2012

(30) Foreign Application Priority Data

Mar. 15, 2010  (JP) .............................. 2010-056846

(51) Int. Cl.
    *B29C 45/16* (2006.01)
(52) U.S. Cl.
    USPC ........................... 264/163; 264/152; 264/259
(58) Field of Classification Search
    USPC ........................................ 264/152, 163, 259
    See application file for complete search history.

(56) References Cited

U.S. PATENT DOCUMENTS

| 5,040,962 A * | 8/1991 | Waszeciak et al. ............ 425/112 |
| 7,150,625 B2 * | 12/2006 | Skov .............................. 425/527 |
| 7,338,697 B2 | 3/2008 | Abrams |
| 8,411,038 B2 * | 4/2013 | Adams et al. ................. 345/168 |
| 2006/0019065 A1 * | 1/2006 | Taemmerich et al. ......... 428/137 |
| 2007/0164470 A1 * | 7/2007 | Sasaki et al. .................. 264/163 |
| 2008/0145578 A1 | 6/2008 | Yuba et al. |
| 2008/0150186 A1 | 6/2008 | Abrams |
| 2009/0065966 A1 * | 3/2009 | Schilles ........................ 264/163 |
| 2012/0237702 A1 * | 9/2012 | Kaneuchi et al. .......... 428/32.69 |
| 2012/0237726 A1 * | 9/2012 | Kaneuchi et al. ............. 428/141 |

FOREIGN PATENT DOCUMENTS

| JP | 63-126711 | 5/1988 |
| JP | 63126711 | * 5/1988 |
| JP | 3-236920 | 10/1991 |
| JP | 4-22211 | 2/1992 |
| JP | 2001-260168 | 9/2001 |
| JP | 2001-292827 | 10/2001 |
| JP | 2008-149635 | 7/2008 |

* cited by examiner

*Primary Examiner* — Monica Houston
*Assistant Examiner* — Saeed Huda
(74) *Attorney, Agent, or Firm* — Hamre, Schumann, Mueller & Larson, P.C.

(57) ABSTRACT

An object of the present invention is to provide a process for producing an in-mold decorated molded article, which can eliminate the need for deburring after molding and the need for an extra allowance of the molded article. The process includes: clamping a first mold (1) and a second mold (2) to hold a decorative film (207) between the molds; cutting a transfer layer (302) of the decorative film (207) in the molds; injecting resin (5) into the cavity of the mold; cooling the resin (5); and opening the molds to remove the in-mold decorated molded article on which the transfer layer (302) is disposed.

4 Claims, 13 Drawing Sheets

PROCESS FOR PRODUCING IN-MOLD DECORATED MOLDED ARTICLE

TECHNICAL FIELD

The present invention relates to a process for producing an in-mold decorated molded article, in which a decorative film is inserted into molds and then resin is injected into the molds to perform injection molding, thereby decoratively transferring the pattern of a transfer layer provided in the decorative film onto a surface of the molded article.

BACKGROUND ART

Processes for decorating a surface of a resin molded article include insert molding and in-mold molding.

In insert molding, as illustrated in FIG. 12(a), a decorative film 200 cut in a predetermined shape is set in a cavity 101 of a mold 100. Then, as illustrated in FIG. 12(b), resin 5 is injected into the cavity 101 from an injection hole 103a. The resin 5 is cured and then is removed from the opened mold 100, completing a molded article 300 having a surface decorated with the decorative film 200 as illustrated in FIG. 12(c). The decorative film 200 is formed by stacking a UV hard coating layer 210, an anchor layer 211, a printing layer 210, and an adhesive layer 213.

In insert molding, it is difficult to locate the decorative film 200 in the mold 100. Thus, it is difficult to precisely locate the decorative film 200 in the molded article 300. As illustrated in FIG. 13(a), an end of the decorative film 200 embedded into the article is fully covered with the resin 5 and thus the end of the decorative film 200 in a finished state is not exposed. The decorative film 200 appears to be firmly joined to the resin 5 but actually, the decorative film 200 easily peels off from the resin 5. FIG. 13(b) is a cross-sectional view taken along the arrows A-A of FIG. 13(a), illustrating a state of the end of the decorative film 200.

In a conventional process of in-mold molding, a long decorative film 207 in FIG. 9 is used instead of the cut decorative film 200 that is set in the mold 100 in insert molding.

In in-mold molding, the decorative film is easily located and the productivity is higher than that of insert molding. An in-mold decorated molded article removed from an opened mold may have so-called "foil flash" that occurs when a transfer layer from the decorative film remains around the article. Foil flash is manually removed after the removal of the molded article or is removed with a special tool after molding.

The decorative film 207 used in in-mold molding includes a PET base film 208 that continuously supplies the decorative film 207 into the mold, a release layer 209 formed on the base film 208, a UV hard coating layer 210 that is located on the outermost surface to protect the molded article from scratches, dust, etc. after being transferred onto the molded article, an anchor layer 211 formed on the UV hard coating layer 210, a printing layer 212 formed on the anchor layer 211 to transfer designs such as patterns and figures onto the molded article, and an adhesive layer 213 that is formed on the printing layer 212 and adheres to resin.

In the decorative film 207, a transfer layer 302 to be transferred onto a surface of the molded article is composed of the adhesive layer 213, the printing layer 212, the anchor layer 211, and the UV hard coating layer 210, and a carrier layer 301 not to be transferred onto the molded article is composed of the release layer 209 and the base film 208.

FIG. 10 illustrates in-mold molding using the decorative film 207 according to patent literature 1. The mold includes a stationary mold 103 and a movable mold 104.

In step (a), the decorative film 207 is inserted between the stationary mold 103 and the movable mold 104. At this point, the decorative film 207 is supplied so as to locate the base film 208 near a cavity 104b of the movable mold 104.

In step (b), the movable mold 104 is moved to clamp the decorative film 207.

In step (c), resin 111 is injected from a cavity 103a of the stationary mold 103 to the adhesive layer 213 of the decorative film 207, filling the cavities 103a and 104b in the molds with the resin 111.

In step (d), a molded article 121 is cooled to a predetermined temperature after the completion of the injection of the resin 111.

In step (e), the movable mold 104 is moved and opened. In the opening of the mold, the carrier layer 301 of the decorative film 207 is peeled off from the molded article 121 and the transfer layer 302 of the decorative film 207 is transferred onto the molded article 121. Thus, the outermost surface of the molded article 121 is covered with the UV hard coating layer 210. After that, protruding pins 7 on the stationary mold 103 are pressed to remove the molded article 121 from the mold. The molded article 121 includes a part serving as an end item 121a and a sprue 121b that is an unnecessary part of the item.

In such a process of in-mold molding, the transfer layer 302 can be located in the molds with higher accuracy than in insert molding. However, when the molded article 121 is peeled off from the decorative film 207, a part of the transfer layer 302 may not be finely peeled off around the molded article 121, so that the part having not been transferred onto the molded article 121 may be peeled off and remain on the molded article 121, causing foil flash 303 to occur (see an enlarged view in FIG. 10(e)).

In the production of the in-mold decorated molded article, in the absence of an extra machine allowance other than the sprue 121b, the formed foil flash 303 is manually cut off from the molded article 121 with a box cutter or the like in a downstream process after molding.

As illustrated in FIG. 11(a), an extra machine allowance may be provided outside the required dimensions of the molded article. In this case, a cutting step is necessary for separating the molded article 121 into the end item 121a and the unnecessary sprues 121b.

In the cutting step of FIG. 11(b), the molded article 121 is cut with cutting tools 11. The cutting tool 11 includes cutters 11a for cutting and a base 11b on which the cutters 11a are fixed. The cutters 11a vertically hold predetermined inclined faces 12c of the molded article 121 to cut off the sprues 121b from the molded article 121, obtaining the end item 121a.

CITATION LIST

Patent Literature

Patent Literature 1: Japanese Patent Laid-Open No. 2001-260168

SUMMARY OF INVENTION

Technical Problem

In the process of in-mold molding, the decorative film in the mold can be located with higher accuracy than in insert molding. However, as has been discussed, the foil flash 303 may occur.

In the production of the in-mold decorated molded article, in the absence of an extra machine allowance other than the sprue 121*b*, the formed foil flash 303 is manually cut off from the molded article 121 with a box cutter or the like in a downstream process after molding.

As illustrated in FIG. 11(*a*), an extra machine allowance may be provided outside the required dimensions of the molded article. In this case, a cutting step is necessary for separating the molded article 121 into the end item 121*a* and the unnecessary sprues 121*b*.

In the cutting step of FIG. 11(*b*), the molded article 121 is cut with the cutting tools 11. The cutting tool 11 includes the cutters 11*a* and the base 11*b* on which the cutters 11*a* are fixed. The cutters 11*a* vertically hold the predetermined inclined faces 12*c* of the molded article 121 to cut off the sprues 121*b* from the molded article 121, obtaining the end item 121*a*.

In the conventional process of in-mold molding, the removal of the foil flash 303 requires a downstream process to remove foil flash from the molded article after molding. Moreover, in the case where it is difficult to remove only the foil flash 303, an extra allowance is provided outside the dimensions of the molded article to enable cutting and deburring around the molded article. Hence, the manufacturing cost increases because of the cost of after treatment and a material loss.

An object of the present invention is to provide a process for producing an in-mold decorated molded article, which can eliminate the need for deburring after molding and the need for an extra allowance of the molded article.

Solution to Problem

A process for producing an in-mold decorated molded article according to the present invention, includes: locating a decorative film between a first mold and a second mold, the decorative film having a carrier layer and a transfer layer; cutting the transfer layer of the decorative film instead of the carrier layer in a state in which the decorative film is held between the first mold and the second mold by clamping the first mold and the second mold; injecting resin into a cavity formed by clamping the first mold and the second mold, cooling the resin, and then opening the first mold and the second mold to peel the transfer layer from the carrier layer of the decorative film; and removing the in-mold decorated molded article having the transfer layer on the surface of the resin.

The process further includes moving the nest of the second mold to the first mold to cut the transfer layer of the decorative film.

The process further includes sliding the cut surface of the transfer layer on the inner wall surface of the first mold when moving the nest of the second mold after clamping the first mold and the second mold and injecting the resin.

The process further includes sliding the cut surface of the transfer layer on a mirror surface formed on the inner wall surface of the first mold when moving the nest of the second mold after clamping the first mold and the second mold and injecting the resin.

The relationship between the edge of the nest on the contact surface of the decorative film and the inner edge of the first mold on the contact surface of the decorative film is expressed as R>r where R is a radius for chamfering on the edge of the nest and r is a radius for chamfering on the inner edge of the first mold, and at least one of the edge of the nest and the inner edge of the first mold is chamfered.

The process further includes, when the resin is injected into the cavity formed by clamping the first mold and the second mold, injecting the resin into a recess formed inside the first mold so as to be aligned with the position of the cut surface of the transfer layer, and injecting the resin to the cut surface of the transfer layer so as to cover the cut surface with the resin.

An in-mold decorated molded article according to the present invention is an in-mold decorated molded article of resin, the molded article including a decorative film as a surface layer, wherein the decorative film includes a transfer layer having a cut surface, the cut surface being exposed on the end face of the in-mold decorated molded article, and the resin fills a crack on the cut surface of the transfer layer.

Advantageous Effects of Invention

With this configuration, the transfer layer of the decorative film is cut before molding. Thus, when the in-mold decorated molded article is peeled off from the carrier layer of the decorative film after molding, foil flash does not occur because of the cutting of the transfer layer, achieving an in-mold decorated molded article without the need for removing foil flash on the end face of the molded article.

Moreover, the transfer layer of the decorative film can be cut in the molds before molding, eliminating the need for an extra allowance of the molded article.

DESCRIPTION OF EMBODIMENTS

A process for producing an in-mold decorated molded article of the present invention will be described below in accordance with specific embodiments.

(First Embodiment)

Figure 9:
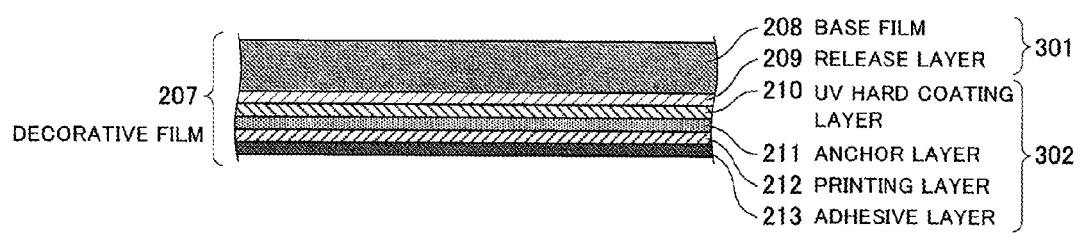
FIG. 9 is a cross-sectional view illustrating a decorative film for in-mold molding.
Figure 10:
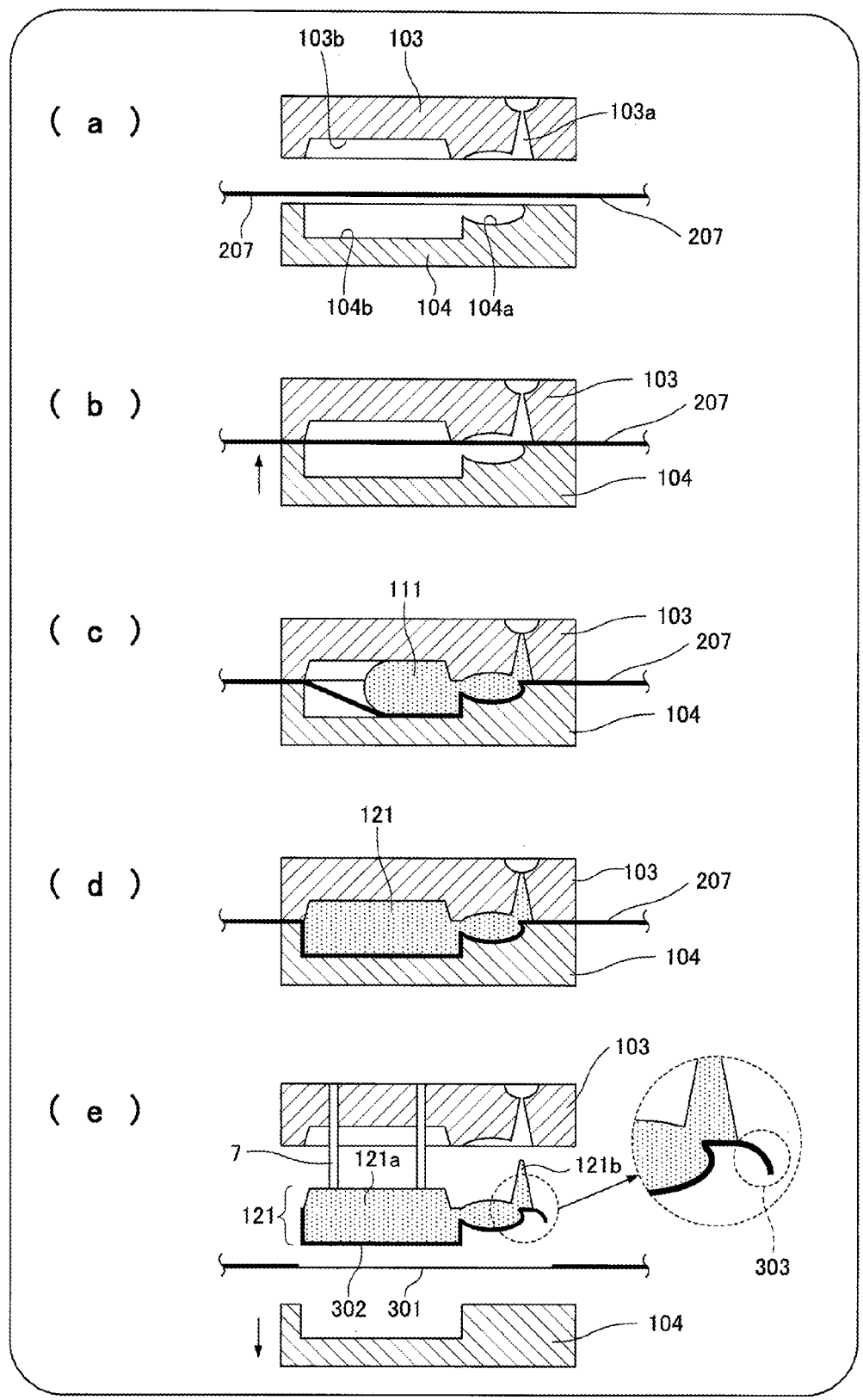
FIG. 10 illustrates a process drawing of a conventional process for in-mold molding.
Figure 11:
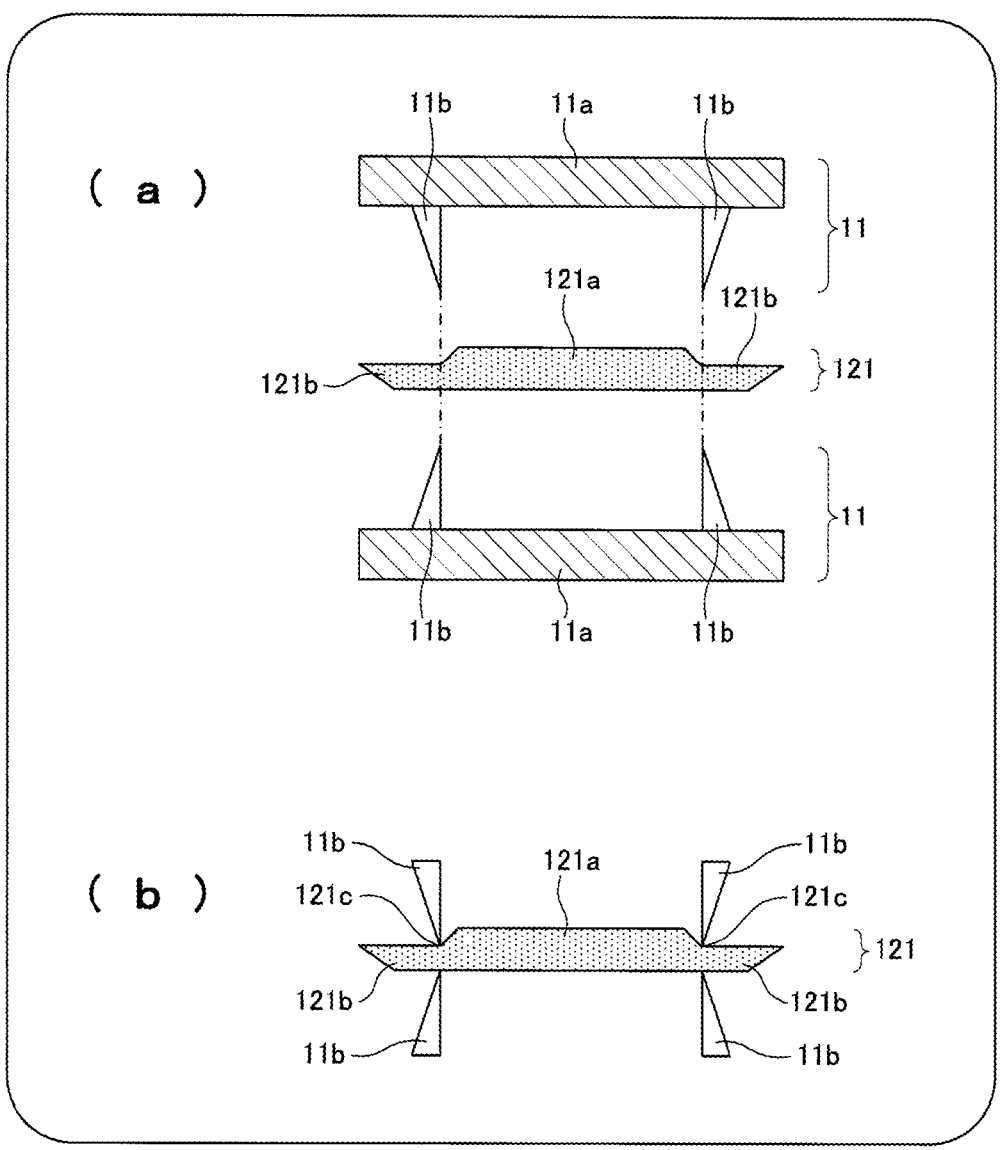
FIG. 11 illustrates explanatory drawings of steps and tools for deburring on the ends of a conventional in-mold decorated molded article.
Figure 12:
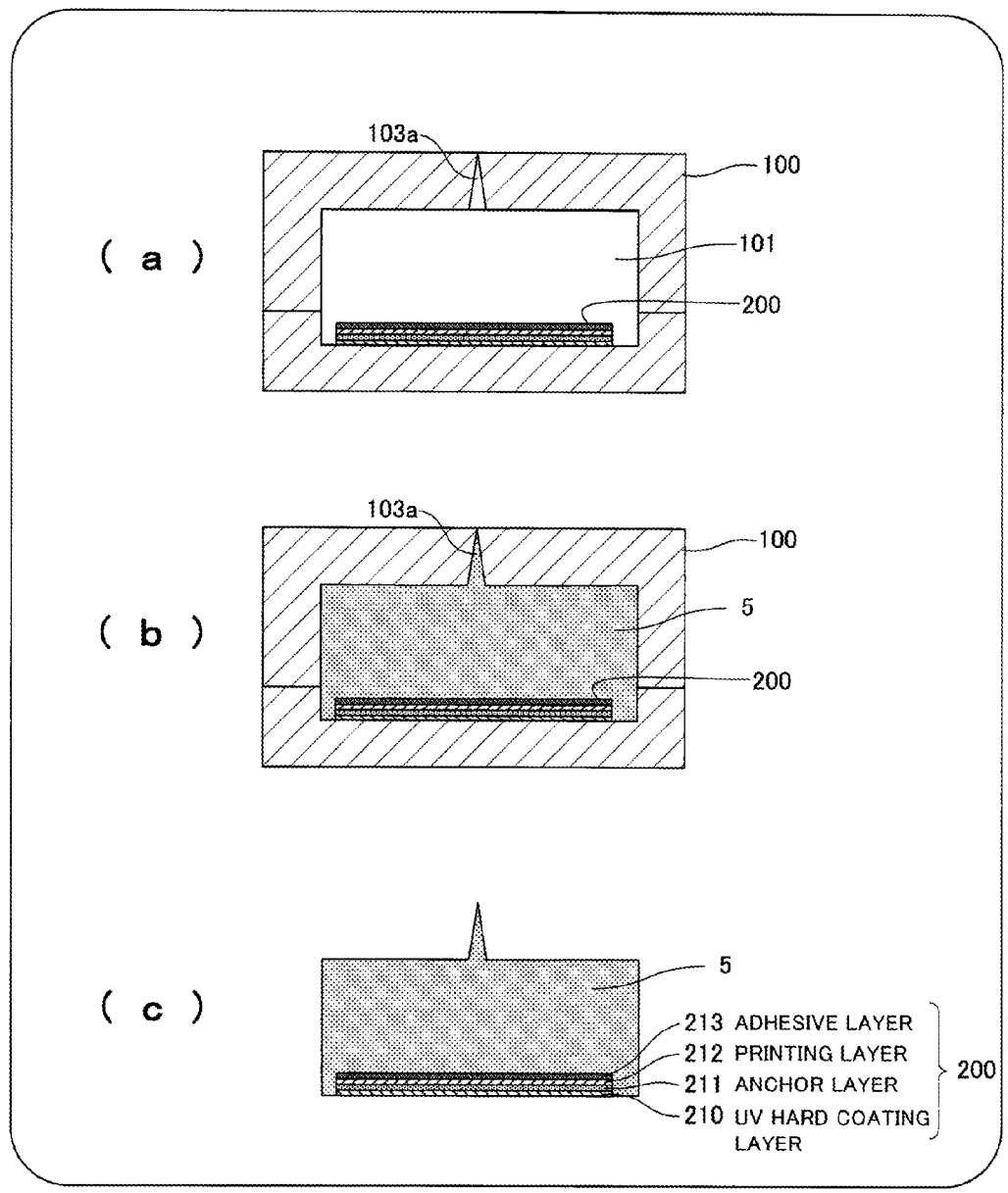
FIG. 12 is a process drawing illustrating a conventional process for insert molding.

FIGS. 1 to 4 are process drawings illustrating a process for producing an in-mold decorated molded article according to a first embodiment of the present invention. A decorative film 207 is identical in structure to that of FIG. 9.

The mold of the first embodiment includes a stationary mold 1 serving as a first mold and a movable mold 2 serving as a second mold. The movable mold 2 has a divided structure of a movable mold body 2b and a nest 2a disposed in the movable mold body 2b so as to move relative to the movable mold body 2b. The nest 2a is separately movable.

Figure 1:
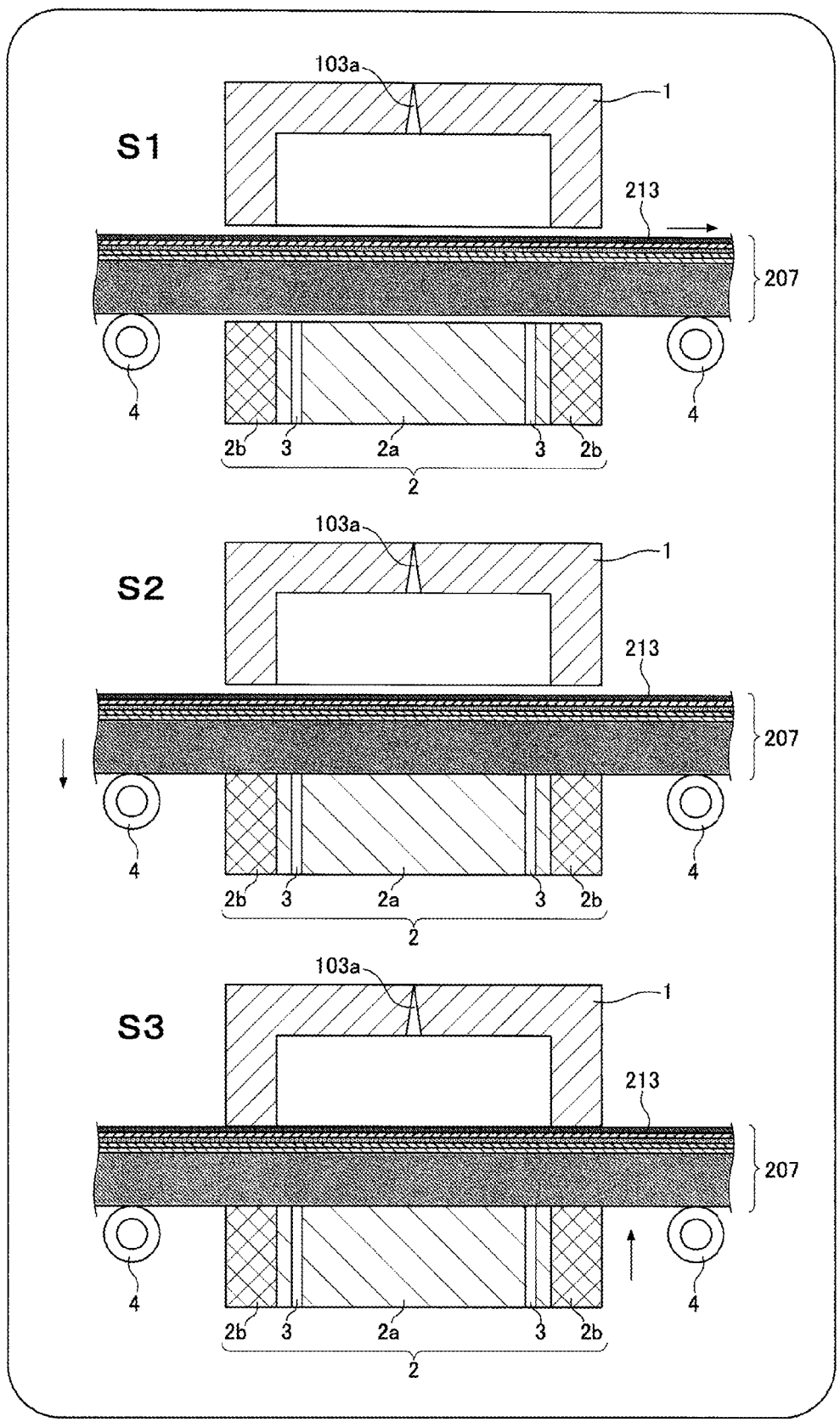
FIG. 1 illustrates cross-sectional views of molds, showing steps S1 to S3 of a process for producing an in-mold decorated molded article according to a first embodiment of the present invention.

In step S1 of FIG. 1, the decorative film 207 drawn from a winding member is set on a film feeder 4 such that an adhesive layer 213 faces an injection hole 103a of the stationary mold 1. The film feeder 4 has the function of feeding the decorative film 207 to the movable mold 2 and the function of positioning control of the patterns and figures of the decorative film 207 in the movable mold 2.

In step S2 of FIG. 1, the decorative film 207 is sucked by suction holes 3 formed on the nest 2a of the movable mold 2 to fix the position of the decorative film 207 in the movable mold 2, and then the decorative film 207 is fixed by a clamping mechanism (not shown). In other words, the decorative film 207 is sucked and held along the shape of the mold surface of the movable mold 2.

In step S3 of FIG. 1, the movable mold 2 is closed. Thus, the decorative film 207 is held between the stationary mold 1 and the movable mold body 2b.

Figure 2:
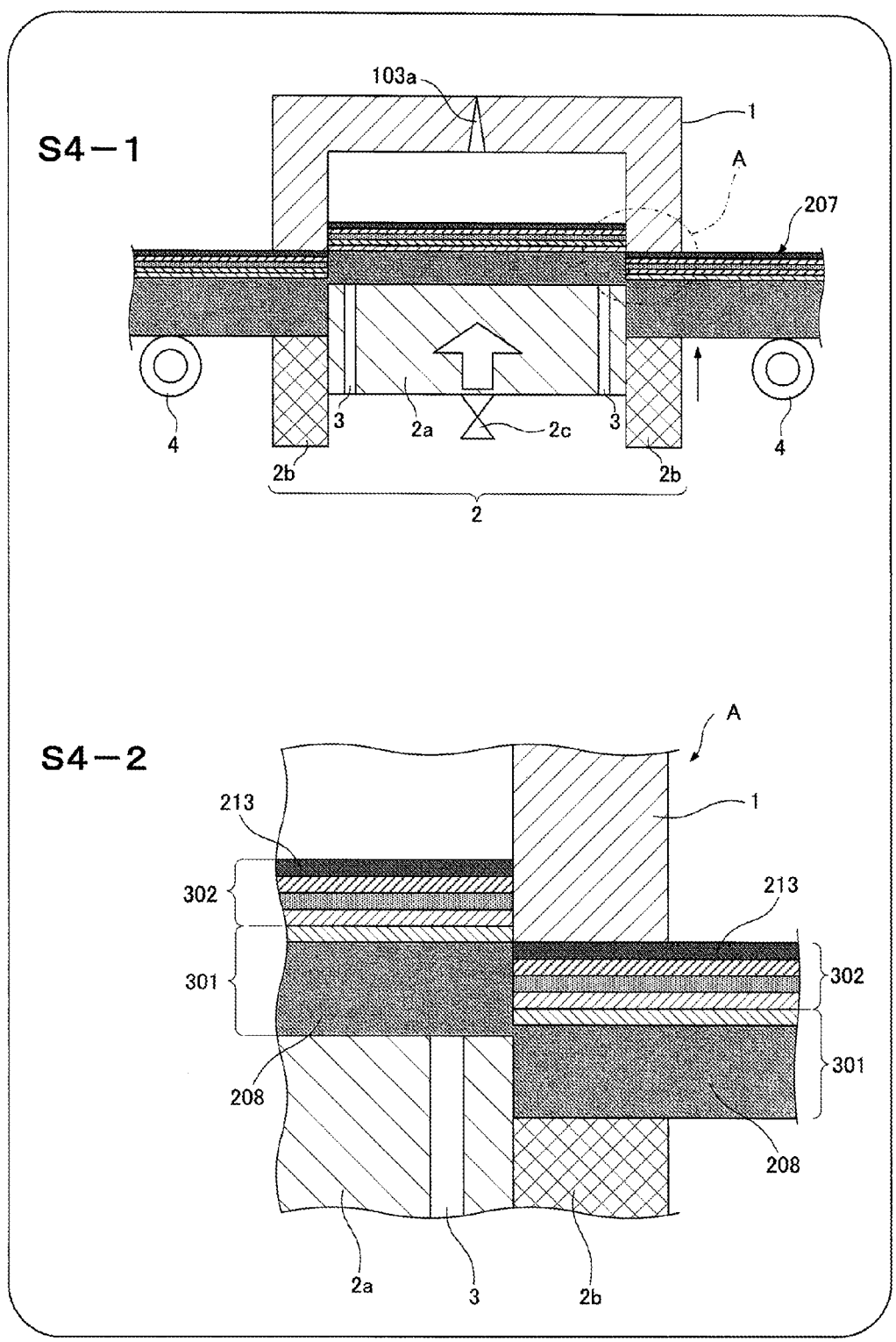
FIG. 2 illustrates a cross-sectional view of the molds and an enlarged view of a principal part, showing step S4 of the first embodiment.

In step S4, as illustrated in (S4-1) of FIG. 2, the decorative film 207 is partially cut in the mold. (S4-2) in FIG. 2 is an enlarged view of principal part A of (S4-1) in FIG. 2. The nest 2a is moved to the stationary mold 1 by a movable mechanism 2c, so that the decorative film 207 has a shearing force on the boundary between a part held by the stationary mold 1 and the movable mold body 2b and a part driven by the nest 2a to the stationary mold 1, thereby cutting a transfer layer 302. At this point, the end of the cut transfer layer 302 has small gaps, asperities, cracks (fractures), and so on. The movable mechanism 2c is movable in a minimum distance range allowing cutting of a UV hard coating layer 210, an anchor layer 211, a printing layer 212, and an adhesive layer 213 that constitute the transfer layer to be transferred to the molded article. The movable mechanism 2c is movable in a range that does not cut a base film 208, so that only the transfer layer 302 of the decorative film 207 is cut.

To be specific, the movable mechanism 2c is moved to a distance shorter than the thickness of the base film 208 and longer than the thickest portion of the transfer layer 302. The base film 208 is 20 µm to 50 µm in thickness, and the transfer layer 302 is 2 µm or 40 µm in thickness. In this case, the base film 208 is a PET film having a thickness of 38 µm and the thickest portion of the transfer layer 302 is 15 µm in thickness.

Figure 3:
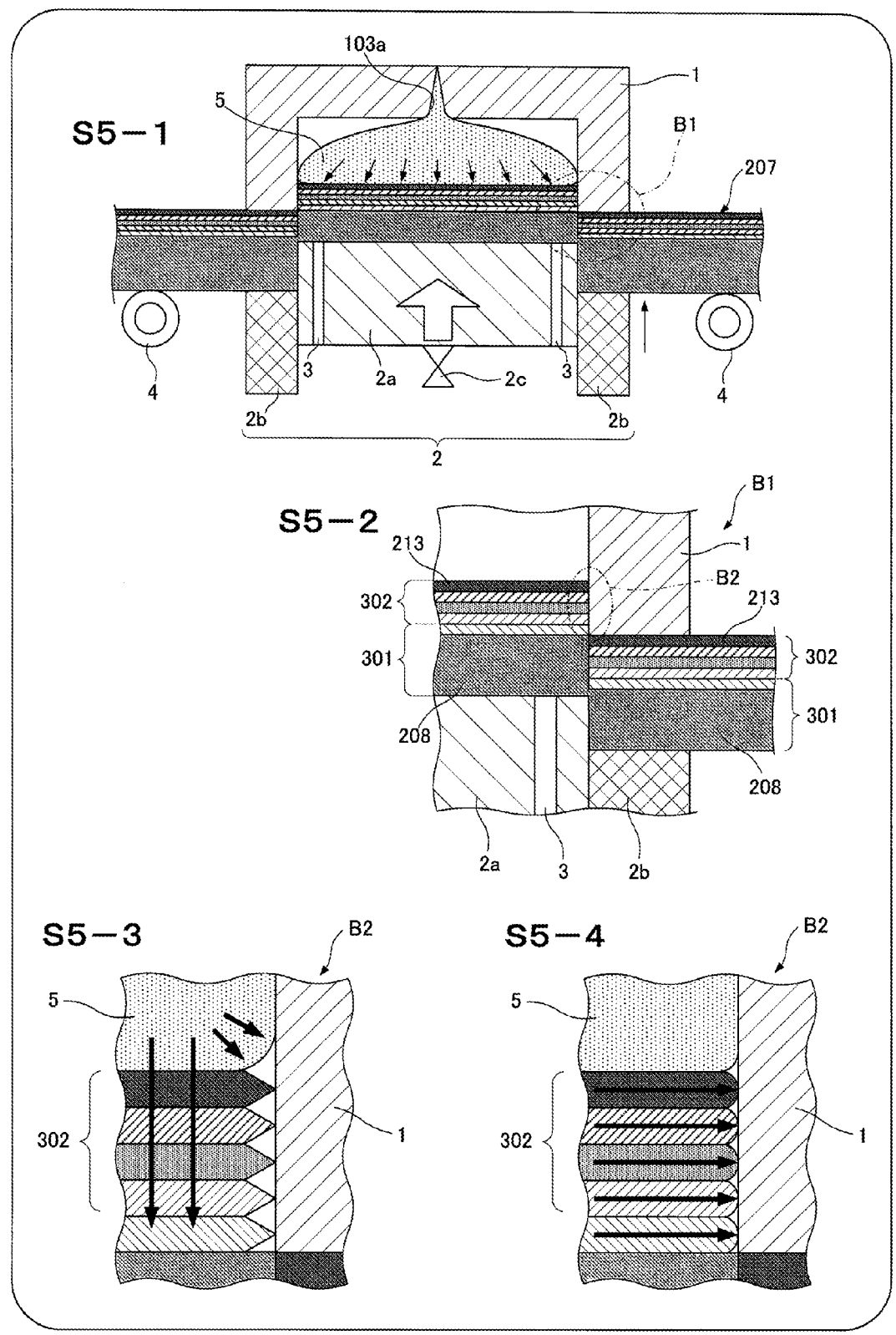
FIG. 3 illustrates a cross-sectional view of the molds and an enlarged view of a principal part, showing step S5 of the first embodiment.

In step S5, as illustrated in (S5-1) of FIG. 3, the injection of resin 5 is started from the injection hole 103a of the stationary mold 1 after the cutting of the UV hard coating layer, the anchor layer, the printing layer, and the adhesive layer that correspond to the transfer layer 302 of the decorative film 207 to be transferred to the molded article.

At this point, the heat of the resin 5 sufficiently propagates through the cut transfer layer 302 of the decorative film 207, allowing the decorative film 207 to expand in principal part B1 of (S5-1) in FIG. 3 as illustrated in (S5-2) of FIG. 3 and a partial enlarged view of (S5-3) in FIG. 3. (S5-3) illustrates principal part B2 of (S5-2) in FIG. 3. Thus, the rough cut surface of the transfer layer 302 is strongly pressed to the inner wall surface of the stationary mold 1. As illustrated in a partial enlarged view of (S5-4) in FIG. 3, the cut surface of the transfer layer 302 is strongly pressed to the inner wall surface of the stationary mold 1 so as to round the outer periphery of the transfer layer 302, forming a smooth cut surface. In other words, foil flash is less likely to occur than in the conventional configuration.

Figure 8:
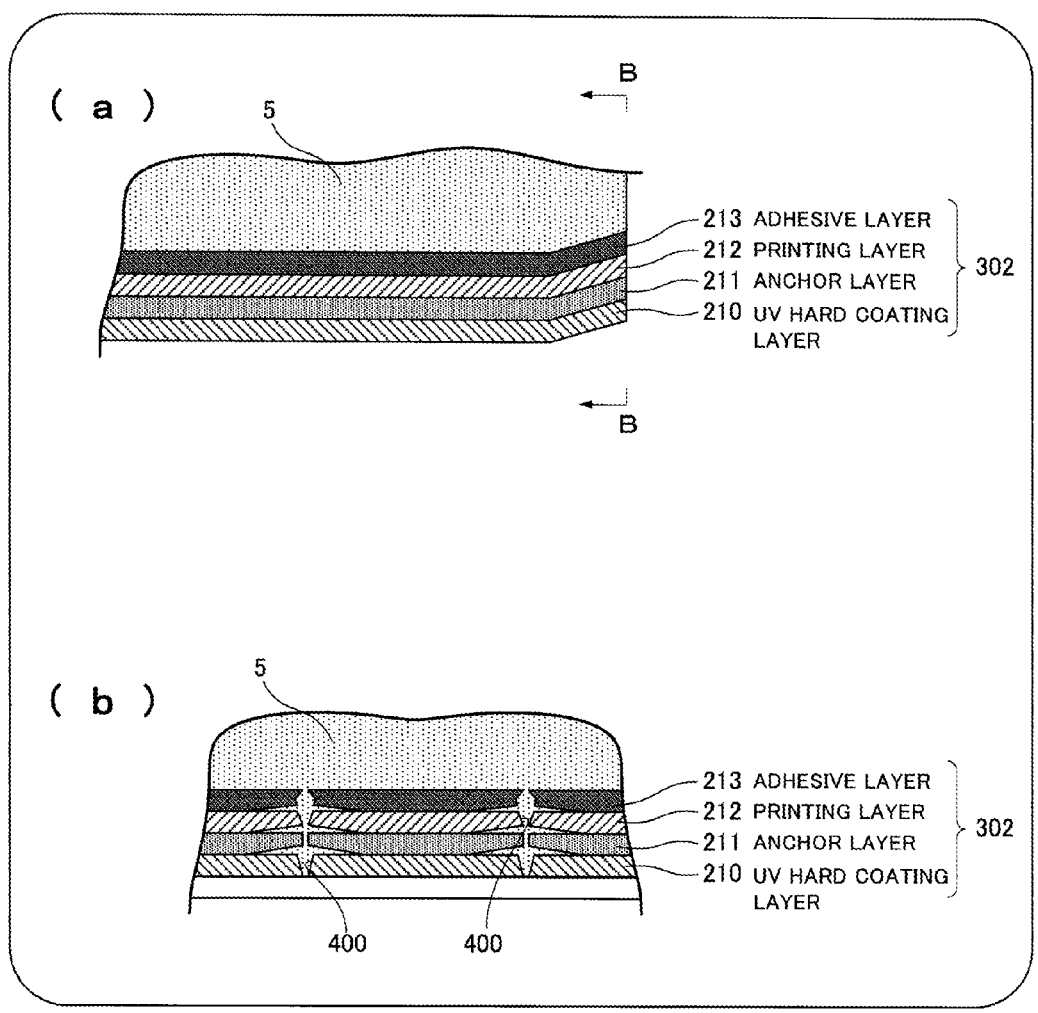
FIG. 8(*a*) is an enlarged view illustrating the end face of the in-mold decorated molded article according to the foregoing embodiments, and FIG. 8(*b*) is a cross-sectional view taken along the arrows B-B of FIG. 8(*a*).
Figure 13:
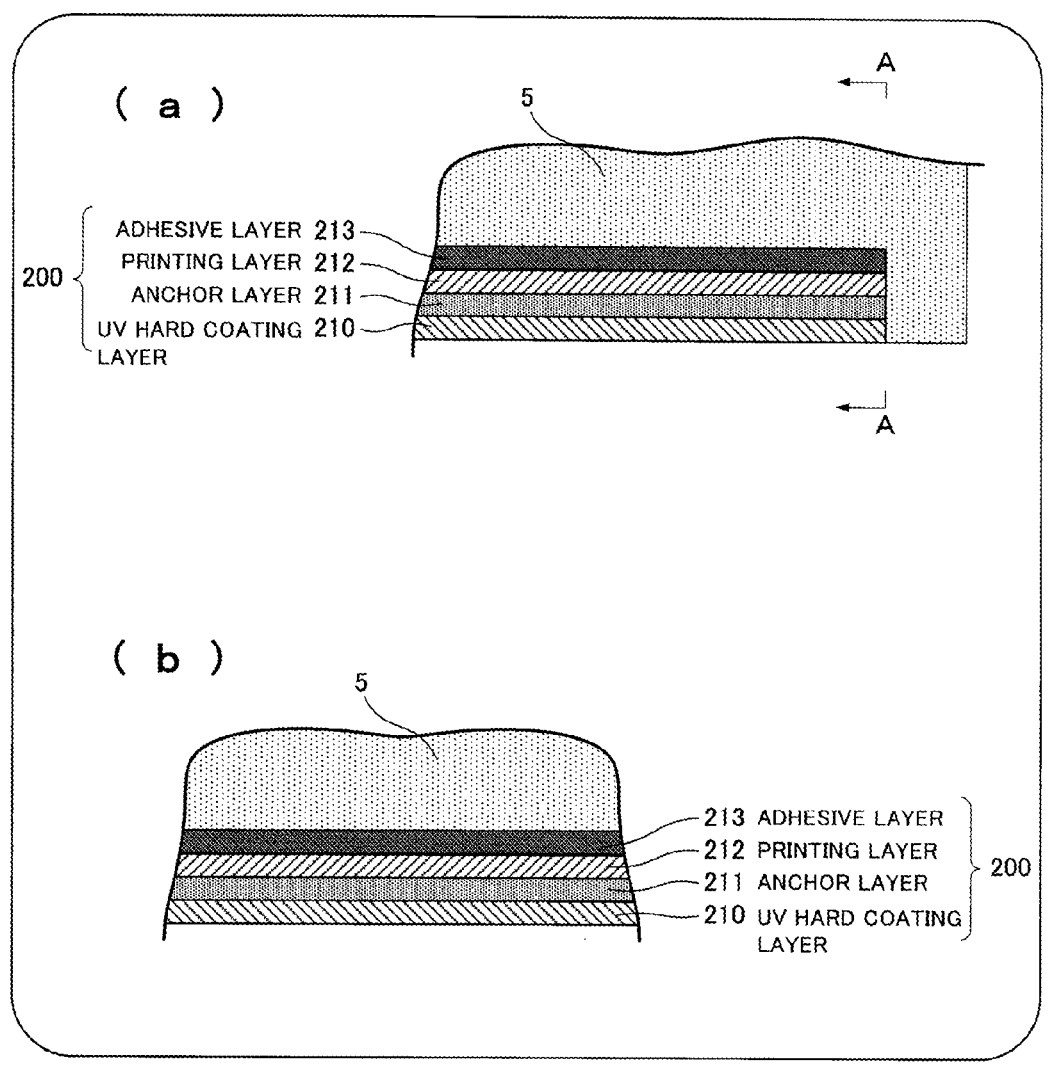
FIG. 13(*a*) is an enlarged view illustrating a decorative film on the end face of a conventional insert molded article, and FIG. 13(*b*) is a cross-sectional view taken along the arrows A-A of FIG. 13(*a*).

As illustrated in FIG. 8(a), the cut surface of the transfer layer 302 of the decorative film 207 is exposed on the end face of the in-mold decorated molded article, and small gaps of about several tens pm, asperities, and cracks (fractures) 400 appear on the cut surface of the transfer layer 302 of the decorative film 207. As illustrated in FIG. 8(b), the molding resin 5 enters the gaps, asperities, and cracks (fractures) 400 between the adhesive layer 213 and the printing layer 210, between the printing layer 210 and the anchor layer 211, and between the anchor layer 211 and the UV hard coating layer 210, leading to a higher adhesion strength between the outer periphery of the transfer layer 302 and the molding resin after molding. Thus, even in the case where the end of the transfer layer 302 is exposed in a finished state, the decorative film does not peel off unlike in insert molding of FIGS. 13(a) and 13(b).

In insert molding, the decorative film 200 having an unexposed end in a finished state easily peels off. This is because the decorative film 200 is efficiently cut and separated using a cutter having extremely high cuttability and thus the end face of the decorative film 200 is a smooth cut surface free from the small gaps, asperities, and cracks (fractures) 400 illustrated in FIG. 8(b), leading to a lower adhesion strength with the molding resin.

Figure 4:
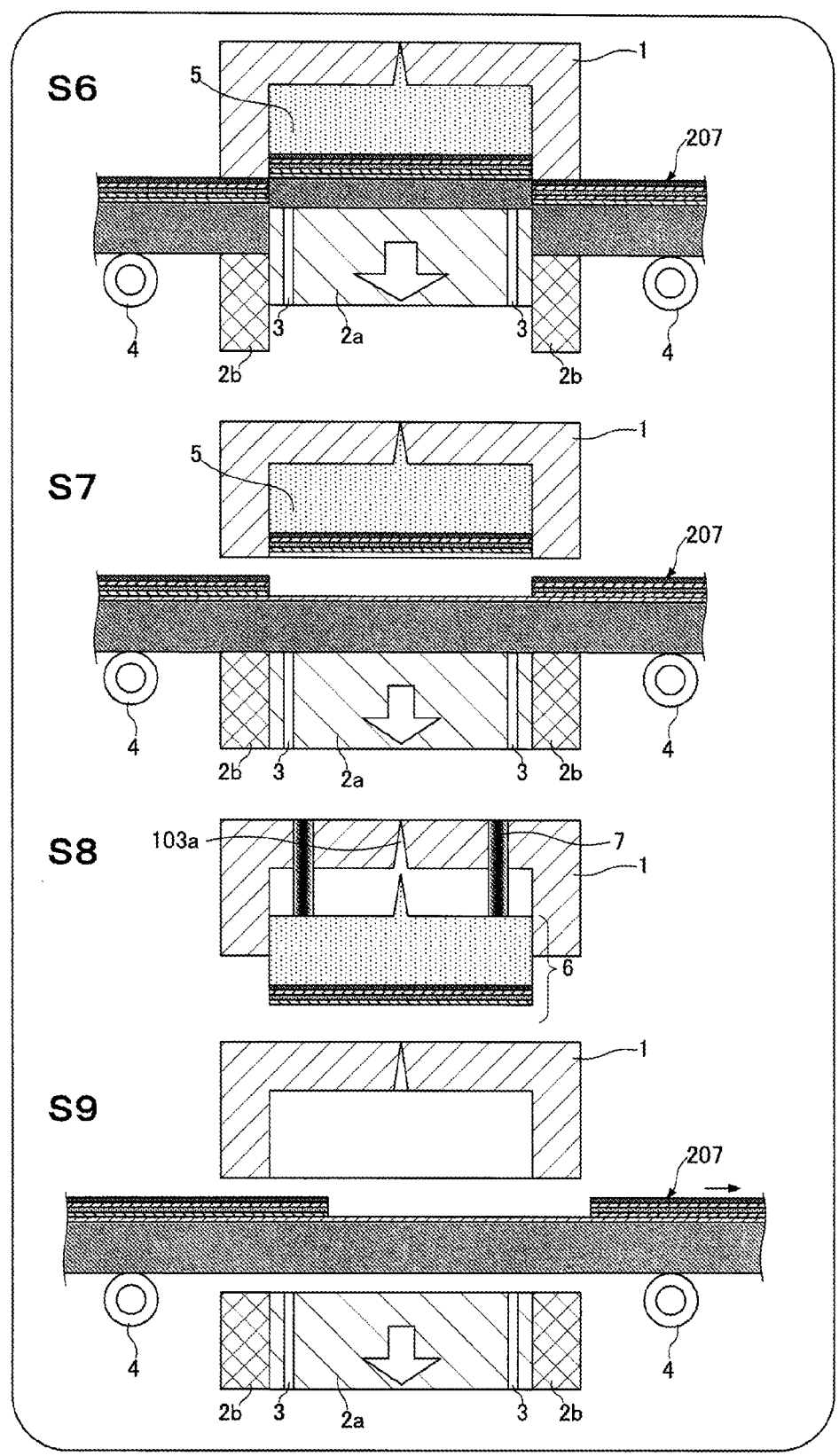
FIG. 4 illustrates cross-sectional views of the molds, showing steps S6 to S9 according to the first embodiment.

As illustrated in FIG. 4, the resin 5 is fully injected into the mold in step S6. In this state, the movable mechanism 2c having separately moved the nest 2a of the movable mold 2 is pressed back to the original position by the pressure of the resin 5 injected into the mold. At this point, the transfer layer of the decorative film is in sliding contact with the wall surface of the stationary mold 1 and the end of the transfer layer is finished to a smoother surface by sliding friction, thereby suppressing the occurrence of foil flash.

In step S7 of FIG. 4, after the resin 5 is sufficiently cooled in the mold, the movable mold 2 is moved and opened to peel off a carrier layer 301 and the transfer layer 302 of the decorative film 207, and the removal of an in-mold decorated molded article 6 from the mold is prepared. The UV hard coating layer, the anchor layer, the printing layer, and the adhesive layer have been transferred onto the surface of the resin 5. In the present embodiment, the transfer layer 302 is cut beforehand in step S4 and the cut surface of the transfer layer 302 is coated with the resin 5. In this state, the transfer layer 302 is peeled off from the carrier layer 301, hardly causing foil flash.

In step S8 of FIG. 4, protruding pins 7 of the stationary mold 1 are moved to remove the in-mold decorated molded article 6 from the mold.

In step S9 of FIG. 4, for the subsequent molding, the suction of the nest 2a of the movable mold 2 to the base film by the suction holes 3 is stopped, the base film serving as the carrier of the decorative film 207, and the suction of the movable mold 2 to the release layer is stopped. The film feeder 4 feeds the decorative film 207 to a certain position where the transfer layer has printed patterns and figures used for the subsequent molding.

(Second Embodiment)

Figure 5:
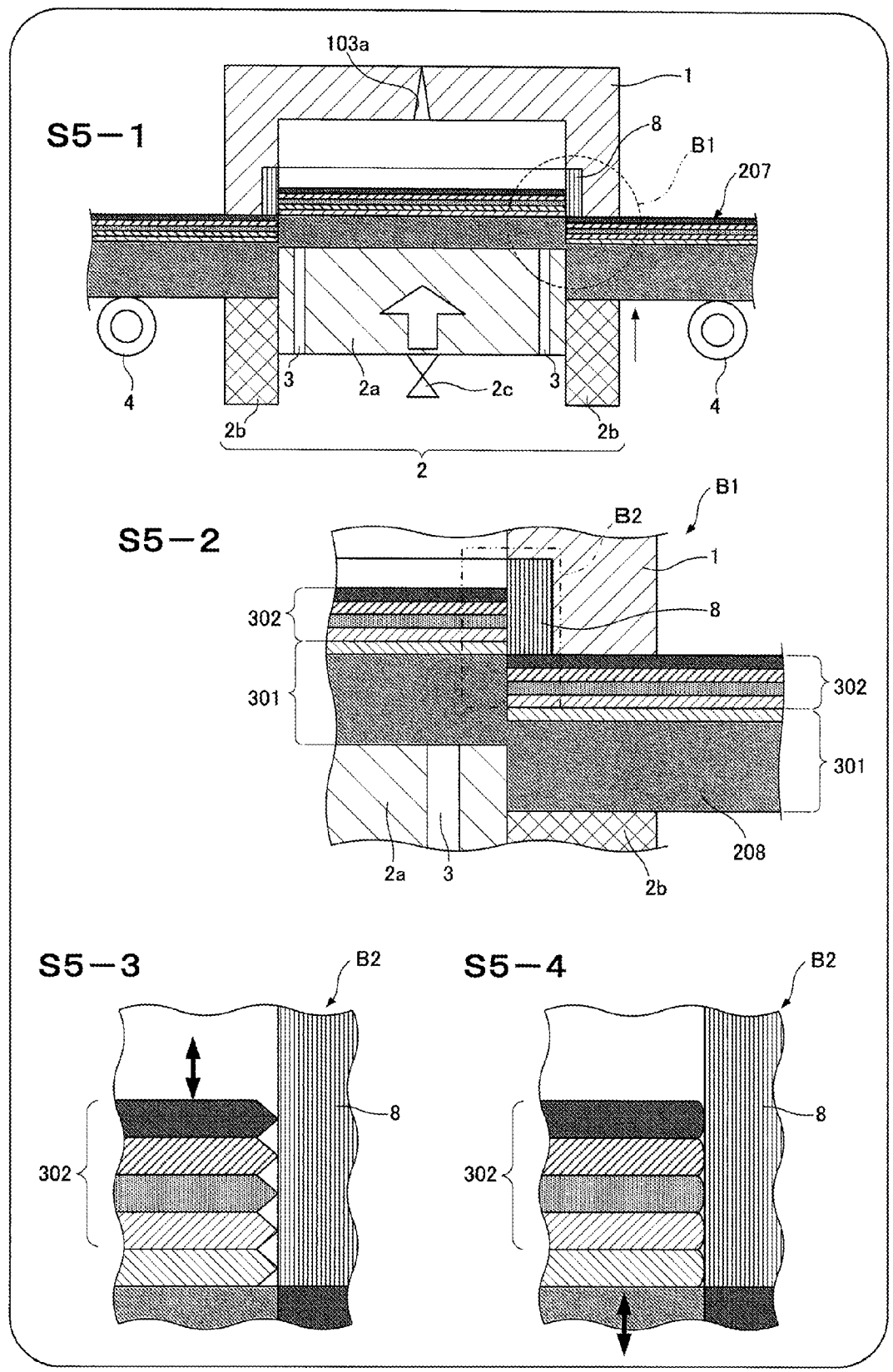
FIG. 5 illustrates a cross-sectional view of molds and an enlarge view of a principal part according to a second embodiment of the present invention.

FIG. 5 shows a second embodiment of the present invention.

In step S5 of the first embodiment, the nest 2a of the movable mold 2 is moved to the stationary mold 1 by the movable mechanism 2c to cut the transfer layer 302 (the UV hard coating layer, the anchor layer, the printing layer, the adhesive layer) of the decorative film 207, and then the cut surface of the transfer layer 302 is slid on the inner wall surface of the stationary mold 1 by the expansion of the transfer layer 302 with heat from the injected resin 5 and the lowering of the nest 2a of the movable mechanism 2c returning to the original position, thereby rounding the cut surfaces of the adhesive layer 213, the printing layer 212, the anchor layer 211, and the UV hard coating layer 210 that constitute the transfer layer 302.

The second embodiment is different, as illustrated in (S5-1) of FIG. 5, from the first embodiment in that a mirror surface 8 is formed on a part of the inner wall of a stationary mold 1 so as to extend around the opening of the stationary mold 1. The mirror surface 8 is smoother than other parts of the inner surface of the stationary mold 1.

Specifically, after a transfer layer 302 of a decorative film 207 is cut in step S4, as illustrated in (S5-2) that is an enlarged view of principal part B1 of (S5-1) in FIGS. 5 and (S5-3) that is an enlarged view of principal part B2 of (S5-2) in FIG. 5, a rough surface on the end of the cut transfer layer 302 of the decorative film 207 is pressed to the mirror surface 8, and then a nest 2a is moved by a movable mechanism 2c. Thus, as illustrated in (S5-4) of FIG. 5, the cut surface of the transfer layer 302 is rounded and mirror-finished. After that, resin 5 is injected, achieving an in-mold decorated molded article with little foil flash and a mirror-finished end.

In this configuration, the nest 2a is preferably moved up and down repeatedly by the movable mechanism 2c any number of times so as to mirror-finish the end of the transfer layer 302.

(Third Embodiment)

Figure 6:
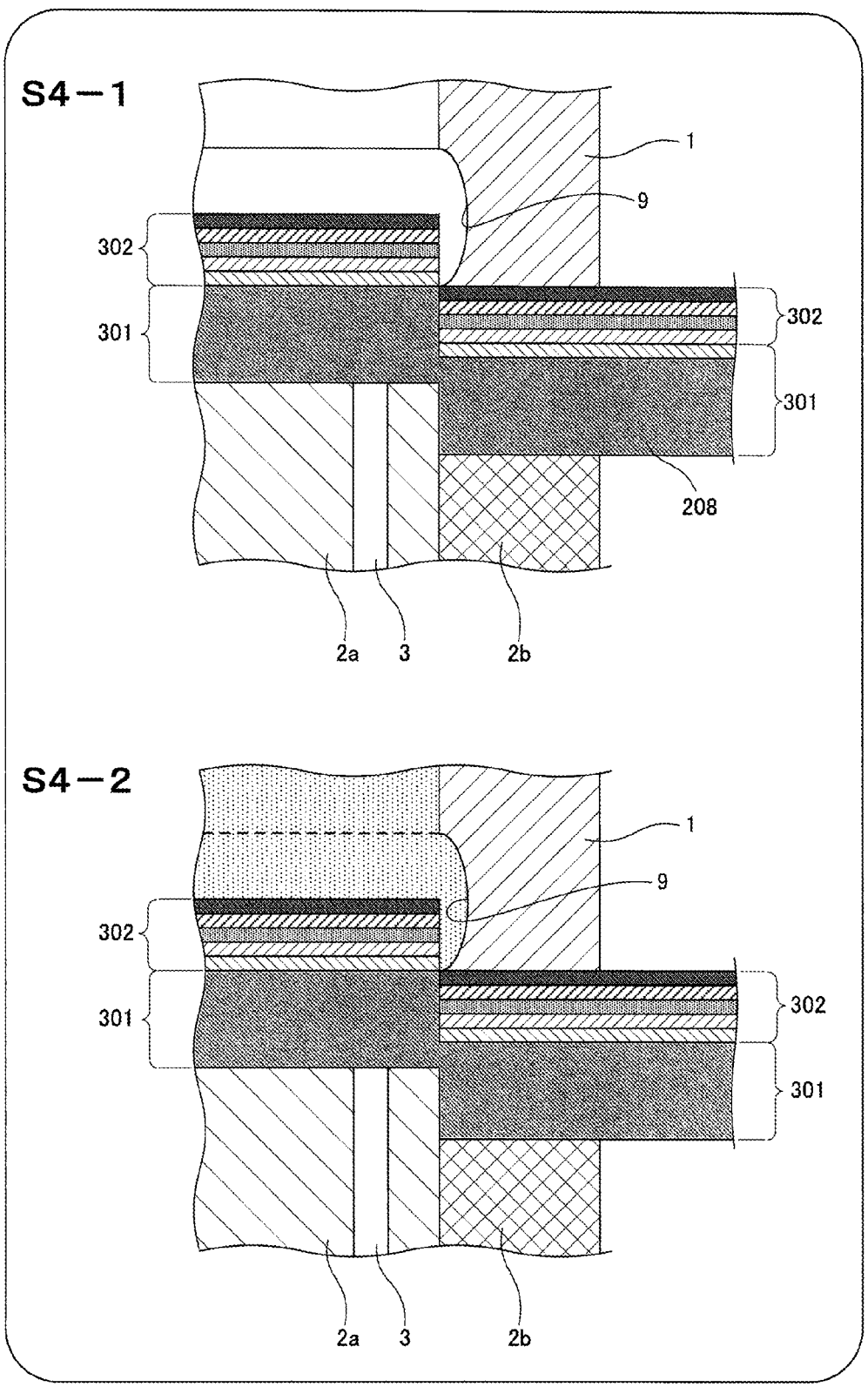
FIG. 6 is an enlarged view illustrating a principal part of molds according to a third embodiment of the present invention.

FIG. 6 shows a third embodiment of the present invention.

In the first embodiment, the cut surface of the transfer layer 302 is slid and rounded on the inner wall of the stationary mold 1. The third embodiment is, as illustrated in FIG. 6, different from the first embodiment in that a recess 9 is formed on the inner wall of a stationary mold 1 so as to extend around the inner wall of the stationary mold 1.

(S4-1) in FIG. 6 is a partial enlarged view illustrating a state in which a transfer layer 302 (a UV hard coating layer, an anchor layer, a printing layer, an adhesive layer) of a decorative film 207 is cut by moving a movable mechanism 2c to the stationary mold 1 before molding.

The recess 9 is provided in the stationary mold 1 so as to be aligned with the cut surface of the transfer layer 302 of the decorative film 207 in the stationary mold 1. Thus, as illustrated in a partial enlarged view in (S4-2) of FIG. 6, resin 5 injected into the recess 9 in step S6 covers the cut surface of the cut transfer layer 302 of the decorative film 207.

Since the resin 5 covers the cut surface, an in-mold decorated molded article can have higher adhesion strength on the cut surface of the transfer layer 302 and between the layers of the transfer layer 302 than in the first embodiment. When the molded article is removed from the mold, foil flash hardly occurs because the transfer layer has been cut before the resin is injected into the mold and the transfer layer is peeled off from a carrier layer while the end of the transfer layer is coated with the resin.

The recess 9 has a dimensional tolerance allowing the molded article to be easily removed by protruding pins 7 in step S8, so that the recess 9 does not interfere with the removal of the molded article.

(Fourth Embodiment)

Figure 7:
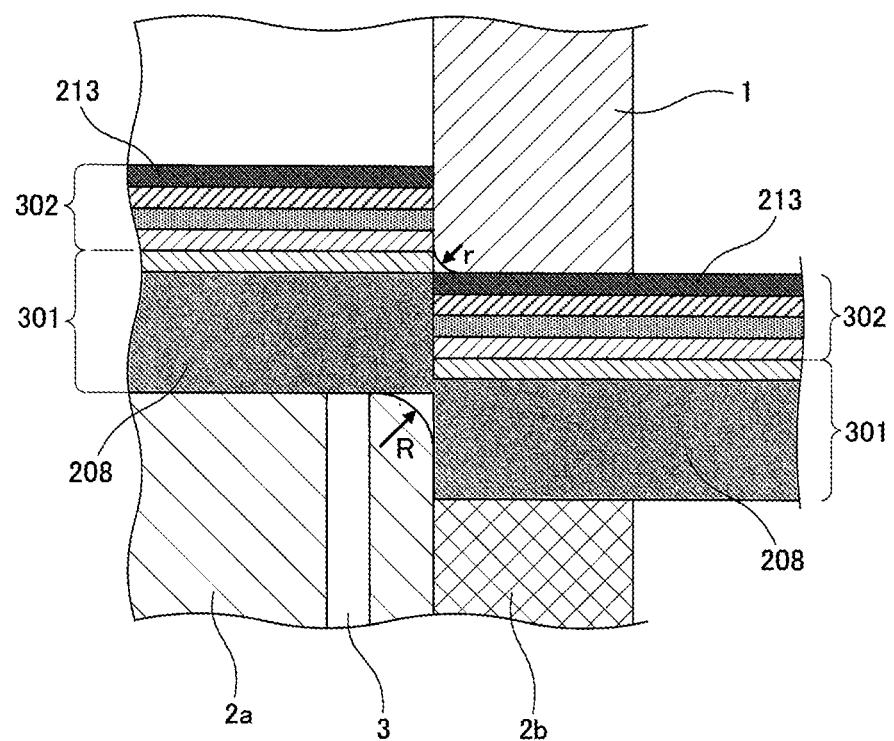
FIG. 7 is an enlarged view illustrating a principal part of molds according to a fourth embodiment of the present invention.

FIG. 7 shows a fourth embodiment of the present invention.

As has been discussed in the first embodiment, only the transfer layer 302 of the decorative film 207 is cut in step S4, the decorative film 207 including the carrier layer 301 and the transfer layer 302. The fourth embodiment will discuss the relationship between a radius R for chamfering on the edge of a nest 2a of a movable mold 2 and a radius r for chamfering on the inner edge of a stationary mold 1, the relationship enabling smooth cutting of a transfer layer 302 without cutting a carrier layer 301 even when the carrier layer 301 has an extremely small thickness.

As illustrated in FIG. 7, in the case where the carrier layer 301 in a decorative film 207 is extremely thin, the radius r for chamfering on the inner edge of the stationary mold 1 is set on the edge so as to facilitate cutting of the transfer layer 302 of the decorative film 207. The radius R for chamfering on the edge of the nest 2a is set to R>r, so that the carrier layer 301 is unlikely to be cut. Specifically, the value of the radius R for chamfering on the edge of the nest 2a was set to 0.05 mm as the decorative film having a thickness of 45 μm. At this point, r was 0.02 mm. This allowed only the transfer layer 302 of the decorative film 207 to be smoothly cut in the mold before molding even in the case where the carrier layer 301 has an extremely small thickness.

In this case, both of the edge of the nest 2a of the movable mold 2 and the inner edge of the stationary mold 1 are chamfered. The inner edge of the stationary mold 1 may form a right angle without being chamfered and only the nest 2a of the movable mold 2 may have a chamfered edge. This configuration was also found to be more effective than the conventional configuration.

INDUSTRIAL APPLICABILITY

The present invention is applicable to the production of a variety of in-mold decorated molded articles, e.g., exterior components for household appliances and exterior components for vehicles.

The invention claimed is:

1. A process for producing an in-mold decorated molded article, comprising:
    locating a decorative film between a first mold and a second mold, the decorative film having a carrier layer and a transfer layer;
    moving a nest of the second mold to the first mold in a state in which the decorative film is held between the first mold and the second mold by clamping the first mold and the second mold to cut the transfer layer of the decorative film and leave the carrier layer intact;
    injecting resin into a cavity formed by clamping the first mold and the second mold, cooling the resin, and then opening the first mold and the second mold to peel the transfer layer from the carrier layer of the decorative film; and
    removing the in-mold decorated molded article having the transfer layer on a surface of the resin,
    wherein a relationship between an edge of the nest on a contact surface of the decorative film and an inner edge of the first mold on the contact surface of the decorative film is expressed as R>r where R is a radius for chamfering on the edge of the nest and r is a radius for chamfering on the inner edge of the first mold, and at least one of the edge of the nest and the inner edge of the first mold is chamfered.

2. The process for producing an in-mold decorated molded article according to claim 1, further comprising sliding a cut surface of the transfer layer on an inner wall surface of the first mold when moving the nest of the second mold after clamping the first mold and the second mold and injecting the resin.

3. The process for producing an in-mold decorated molded article according to claim 1, further comprising sliding a cut surface of the transfer layer on a mirror surface formed on an inner wall surface of the first mold when moving the nest of the second mold after clamping the first mold and the second mold and injecting the resin.

4. The process for producing an in-mold decorated molded article according to claim 1, further comprising, when the resin is injected into the cavity formed by clamping the first mold and the second mold, injecting the resin into a recess formed inside the first mold so as to be aligned with a position of a cut surface of the transfer layer, and injecting the resin to the cut surface of the transfer layer so as to cover the cut surface with the resin.

* * * * *